(12) United States Patent
Cravener

(10) Patent No.: US 11,414,185 B2
(45) Date of Patent: Aug. 16, 2022

(54) OVER-CENTER GIMBAL ACTUATION LOCK

(71) Applicant: Bell Textron Inc., Fort Worth, TX (US)

(72) Inventor: Kyle Thomas Cravener, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 225 days.

(21) Appl. No.: 16/804,357

(22) Filed: Feb. 28, 2020

(65) Prior Publication Data

US 2021/0269148 A1    Sep. 2, 2021

(51) Int. Cl.
| *B64D 27/12* | (2006.01) |
| *B64C 11/28* | (2006.01) |
| *B64C 29/00* | (2006.01) |
| *B64C 11/06* | (2006.01) |

(52) U.S. Cl.
CPC .......... *B64C 29/0033* (2013.01); *B64C 11/28* (2013.01); *B64D 27/12* (2013.01); *B64C 11/06* (2013.01)

(58) Field of Classification Search
CPC ............................... B64C 11/28; B64C 27/50
See application file for complete search history.

(56) References Cited

U.S. PATENT DOCUMENTS

| 2019/0047691 A1 | 2/2019 | Schank et al. |
| 2019/0047692 A1 | 2/2019 | Schank et al. |

*Primary Examiner* — Timothy D Collins
*Assistant Examiner* — Eric Acosta
(74) *Attorney, Agent, or Firm* — Fogarty LLP

(57) ABSTRACT

Embodiments are directed to a propulsion assembly for an aircraft. The propulsion assembly comprises a mast, a hub assembly coupled to the mast and having a gimballing degree of freedom relative to the mast, the hub assembly having an inner hub wall spaced part from the mast, a gimbal lock positioned about the mast, the gimbal lock configured to fit between the inner hub wall and the mast in an engaged position, and an over-center locking mechanism coupled to the gimbal lock. The gimbal lock is movable between a disengaged position and the engaged position relative to the hub assembly. The gimbal lock enables the gimballing degree of freedom in the disengaged position and disables the gimballing degree of freedom in the engaged position. The over-center locking mechanism is configured to move the gimbal lock between the engaged position and the disengaged position.

17 Claims, 11 Drawing Sheets

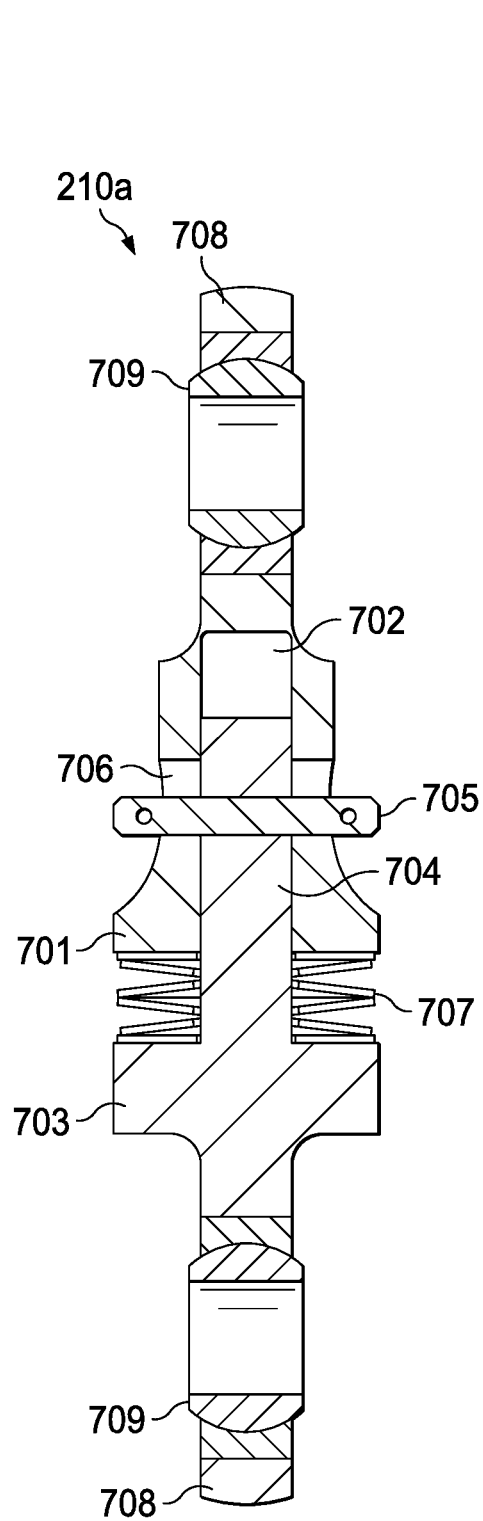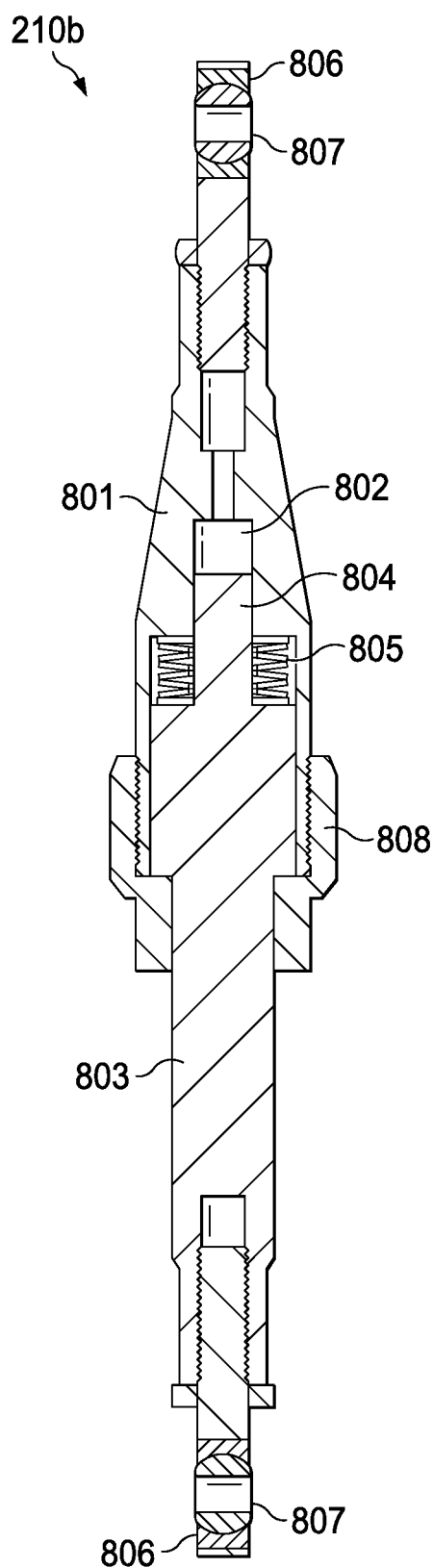
FIG. 7
FIG. 8

OVER-CENTER GIMBAL ACTUATION LOCK

BACKGROUND

Vertical takeoff and landing (VTOL) aircraft are capable of taking off, hovering, and landing vertically. Examples of VTOL aircraft include helicopters and tiltrotor aircraft, which have one or more rotors that provide lift and thrust to the aircraft. The rotors not only enable hovering and vertical takeoff and landing, but also enable forward, backward and lateral flight. There are many rotor assembly configurations that allow for rotor blades movement during operation. Helicopters and tiltrotors may, for example, use a gimbaled proprotor hub that allows the entire hub to gimbal relative to a mast during flapping while the blades remain in a fixed in-plane orientation relative to the hub. VTOL aircraft may include gimbal lock devices to prevent hubs from flapping. Prior gimbal lock devices do not provide for passive locking when the gimbal lock was engaged.

SUMMARY

Embodiments are directed to a high speed, vertical lift aircraft that has vertical take-off and landing capability and is capable of converting to a forward-flight mode (e.g., prop mode). The rotors blades can be folded for high speed forward flight that is propelled by a turbine engine (e.g., jet mode). The rotor blades on the aircraft have a "stop-fold" capability, which means that the rotor blades are stopped in flight and folded back to reduce drag while operating in jet mode. This allows the aircraft to achieve a higher speed than a conventional tiltrotor aircraft that uses prop-driven only forward flight.

Embodiments disclosed herein comprise a mechanism designed to engage and disengage a gimbal lock while also utilizing a passive, over-center locking feature. The over-centering locking feature provides a non-energized lock within the system. The over-center locking feature may use a sprung or unsprung linkage. Additionally, the locking mechanism is designed to accommodate a rotating actuator for moving between locked and unlocked configurations of the gimbal lock.

In an example embodiment, a propulsion assembly for an aircraft comprises a mast, a hub assembly coupled to the mast and having a gimballing degree of freedom relative to the mast, the hub assembly having an inner hub wall spaced part from the mast, a gimbal lock positioned about the mast, the gimbal lock configured to fit between the inner hub wall and the mast in an engaged position, and an over-center locking mechanism coupled to the gimbal lock. The gimbal lock is movable between a disengaged position and the engaged position relative to the hub assembly. The gimbal lock enables the gimballing degree of freedom in the disengaged position and disables the gimballing degree of freedom in the engaged position. The over-center locking mechanism is configured to move the gimbal lock between the engaged position and the disengaged position.

The over-center locking mechanism comprises a pivot idler that is coupled to the mast, and a spring-loaded link that is coupled between the pivot idler and the gimbal lock. The propulsion assembly further comprises a mounting bracket or spinner spoke attached to the mast. The pivot idler is coupled to the mast by the mounting bracket or spinner spoke. The propulsion assembly further comprises an activation idler coupled to a joint between the pivot idler and the spring-loaded link. Movement of the activation idler in a first direction causes the hub lock to move toward the disengaged position, and movement of the activation idler in a second direction causes the hub lock to move toward the engaged position.

The propulsion assembly further comprises an actuator that is coupled to the activation idler. The actuator is configured to move the activation idler alternatively in the first direction and in the second direction. The actuator may be an electronic motor.

The propulsion assembly further comprises one or more mechanical stops that are configured to prevent movement of the activation idler beyond a fixed position.

The pivot idler is configured to rotate between a locked over-center position and an open position. The pivot idler is held in the locked over-center position by the spring-loaded link. The pivot idler may be held in the open position by a centrifugal force, which is generated by rotation of the mast, or by a spring system.

The propulsion assembly further comprises a plurality of rollers on the gimbal lock. The rollers are configured to align the gimbal lock and the hub assembly when the gimbal lock is moved to the engaged position.

The propulsion assembly further comprises a hub extension coupled to the hub assembly. The hub extension is positioned about the mast and forms at least a portion of the inner hub wall spaced part from the mast.

The over-center locking mechanism may comprise a plurality of pivot idlers coupled to the mast by a mounting assembly, a plurality of spring-loaded links, each spring-loaded link coupled between an individual pivot idler and the gimbal lock, and an activation idler coupled to hinged joints between each pivot idler and spring-loaded link. Movement of the activation idler in a first direction causes each pivot idler and spring-loaded link to fold together thereby moving the hub lock toward the disengaged position. Movement of the activation idler in a second direction causes each pivot idler and spring-loaded link to align thereby moving the hub lock toward the engaged position. Two pivot idlers may be positioned on opposite sides of the mast. The activation idler may have two arms that extend across opposite sides of the mast. Each arm is coupled to a separate pivot idler. The two pivot idlers may be joined by a linking member.

In another embodiment, an aircraft comprises a fuselage, a wing coupled to the fuselage, and a propulsion assembly rotatably coupled to the wing. The propulsion assembly comprises a mast, a hub assembly coupled to the mast and having a gimballing degree of freedom relative to the mast, wherein the hub assembly having an inner hub wall spaced part from the mast, a gimbal lock positioned about the mast, wherein the gimbal lock configured to fit between the inner hub wall and the mast in an engaged position, and an over-center locking mechanism coupled to the gimbal lock. The gimbal lock is movable between a disengaged position and the engaged position relative to the hub assembly. The gimbal lock enabling the gimballing degree of freedom in the disengaged position and disabling the gimballing degree of freedom in the engaged position. The over-center locking mechanism is configured to move the gimbal lock between the engaged position and the disengaged position.

The over-center locking mechanism comprises two pivot idlers coupled to the mast by a mounting assembly, two spring-loaded links, each spring-loaded link coupled between an individual pivot idler and the gimbal lock, wherein pairs of pivot idlers and spring-loaded links are coupled by a hinged joint, and an activation idler coupled to the hinged joints on each pair of pivot idler and spring-loaded link. The pivot idlers are positioned on opposite sides of the mast, and the activation idler comprises two arms extending across opposite sides of the mast, each arm coupled to a separate hinged joint. An actuator may be coupled to the activation idler and configured to move the actuation idler in a first direction and in a second direction. Movement of the activation idler in the first direction causes the hub lock to move toward the disengaged position, and movement of the activation idler in a second direction causes the hub lock to move toward the engaged position. The actuator may be an electronic motor.

The pivot idlers are configured to rotate between a locked over-center position and an open position. The pivot idlers are held in the locked over-center position by the spring-loaded links. The pivot idlers are held in the open position by a centrifugal force generated by rotation of the mast or by torsional springs.

Movement of the activation idler in the first direction causes each pivot idler and associated spring-loaded link to fold together thereby moving the hub lock toward the disengaged position. Movement of the activation idler in the second direction causes each pivot idler and associated spring-loaded link to align thereby moving the hub lock toward the engaged position.

BRIEF DESCRIPTION OF THE DRAWINGS

Figure 1A:
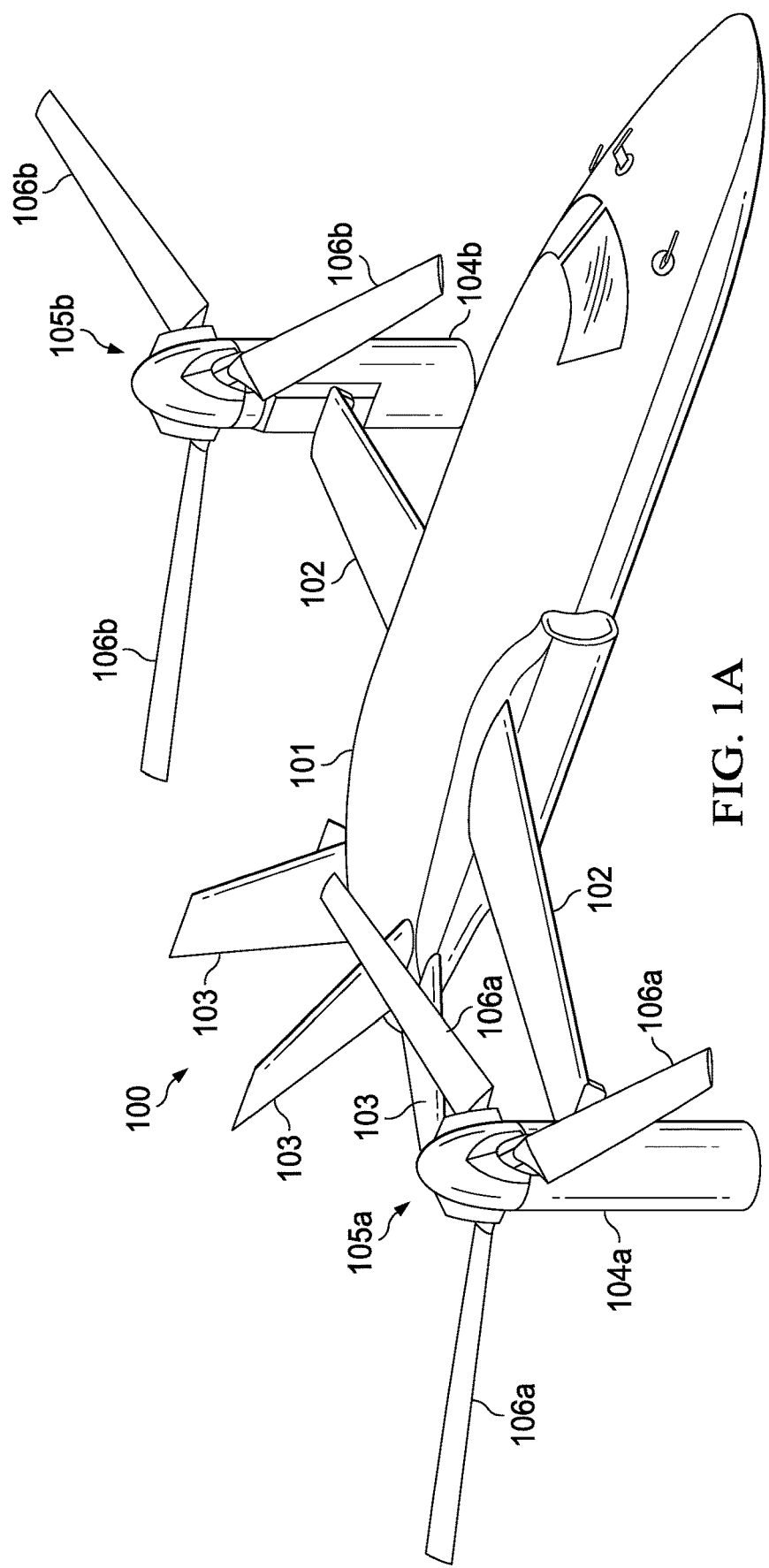
Figure 1B:
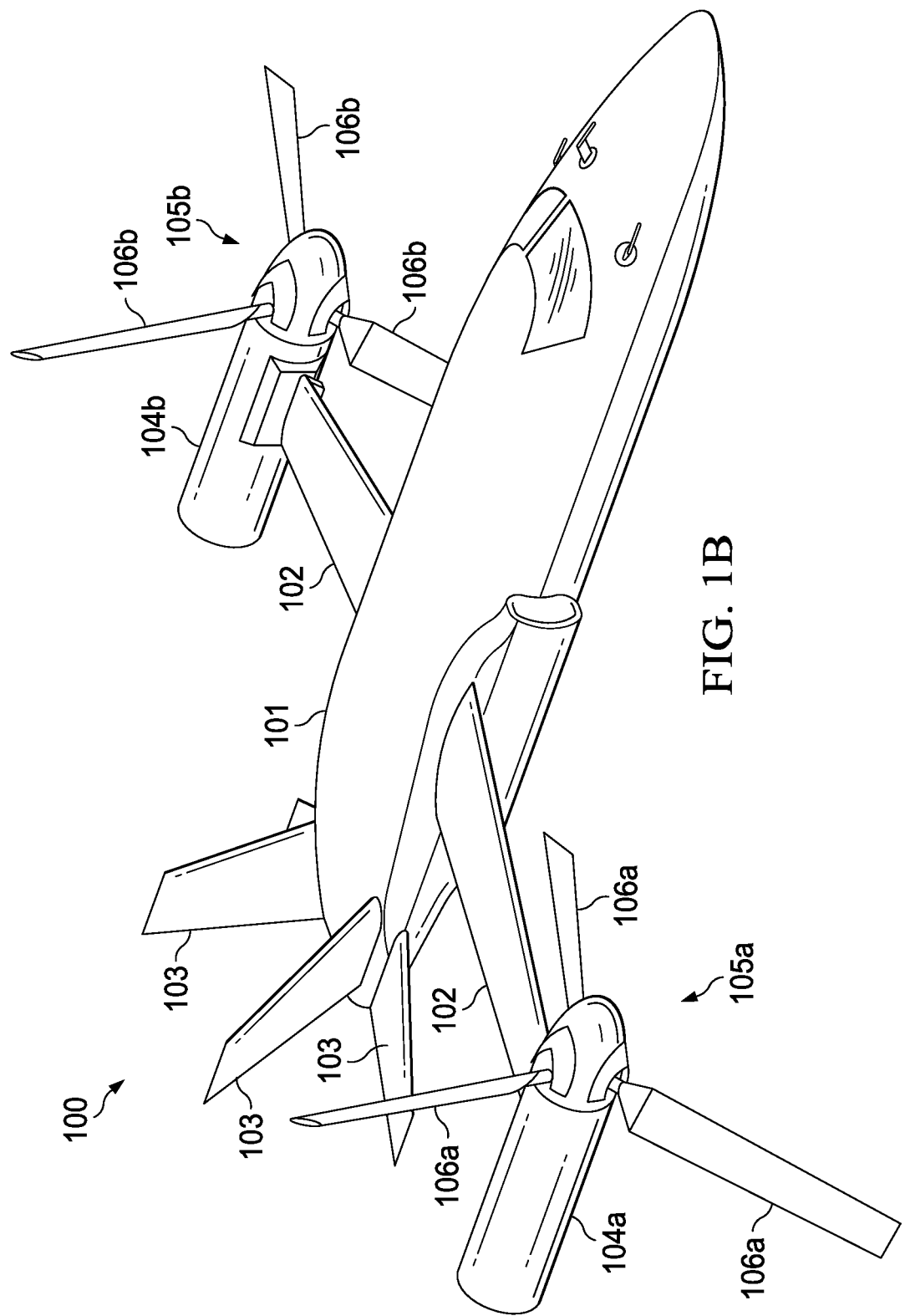
Figure 1C:
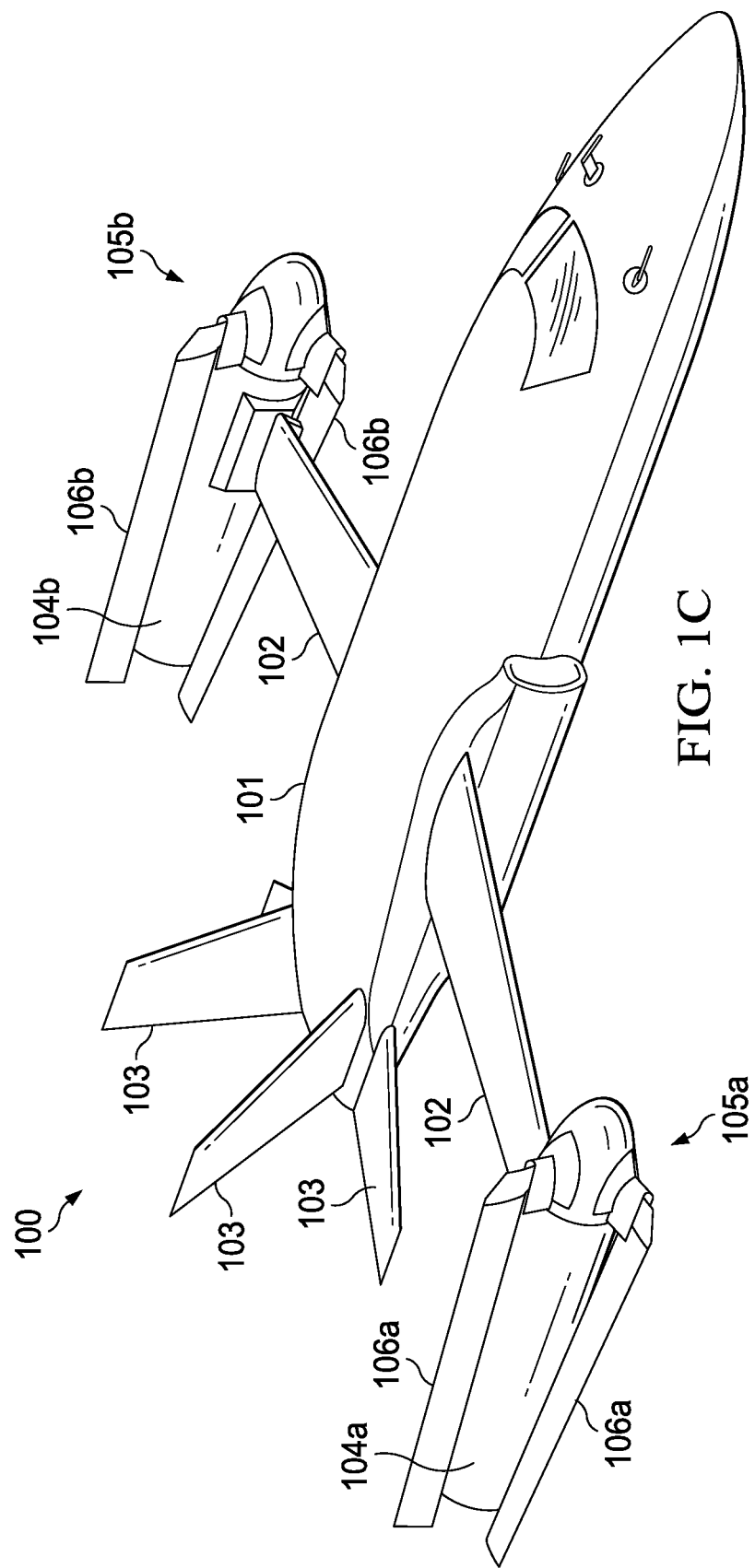

Having thus described the invention in general terms, reference will now be made to the accompanying drawings, which are not necessarily drawn to scale, and wherein:

FIGS. 1A-1C illustrate a tiltrotor aircraft in various flight modes, including helicopter, airplane, and jet/fold-stop modes.

Figure 2A:
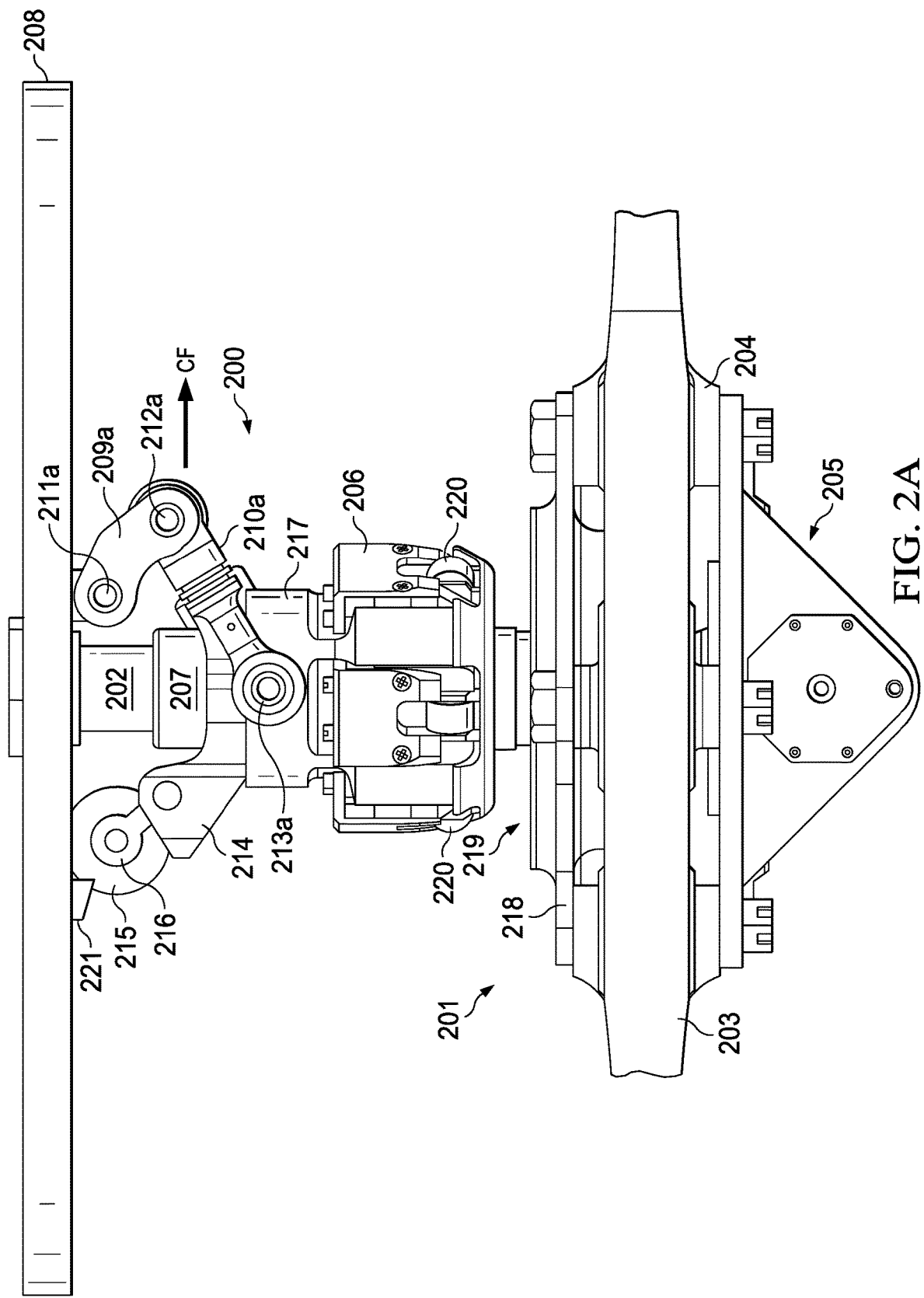
Figure 2B:
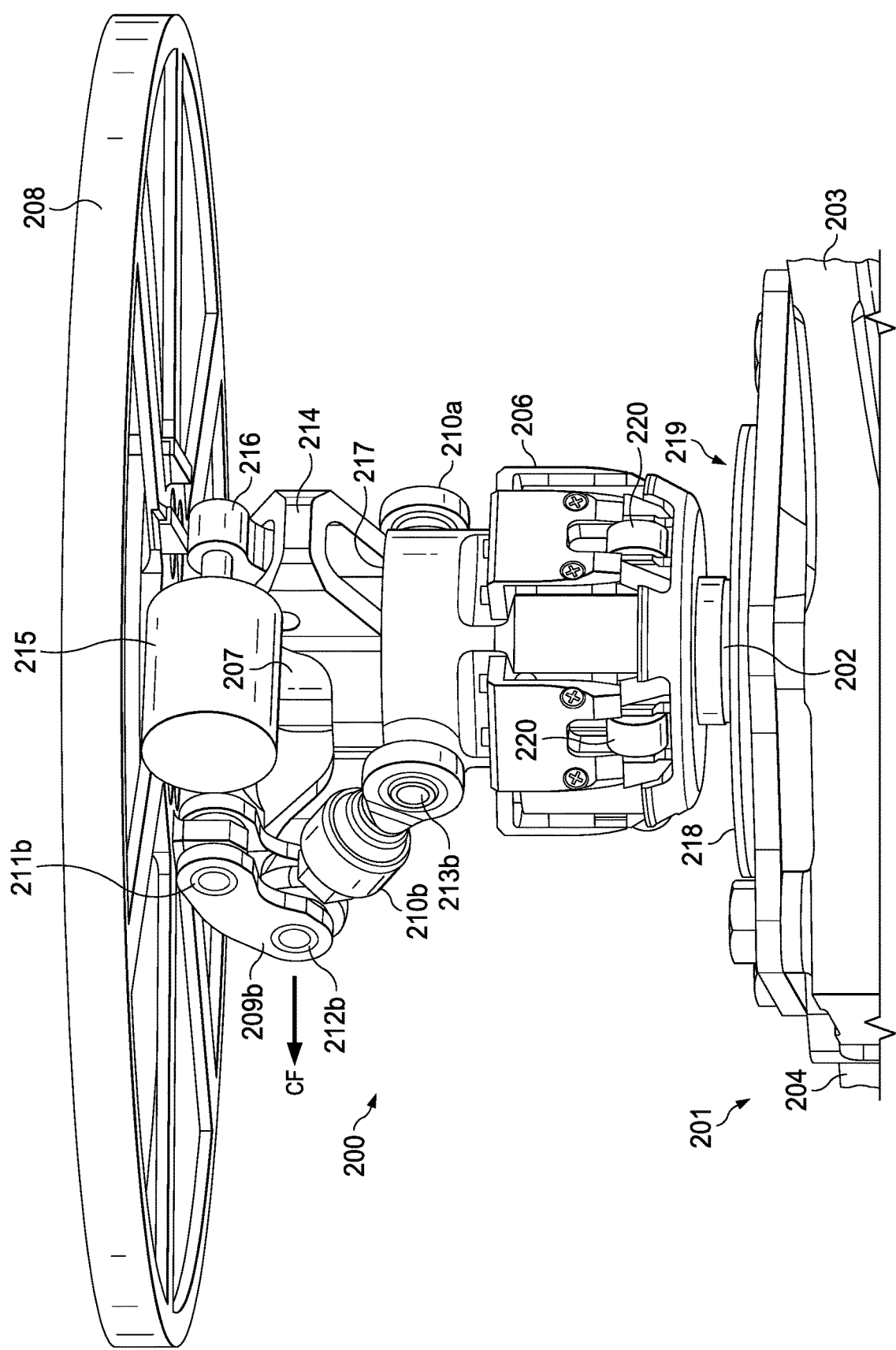

FIGS. 2A and 2B illustrate a gimbal lock assembly in an unlocked configuration according to an example embodiment.

Figure 3A:
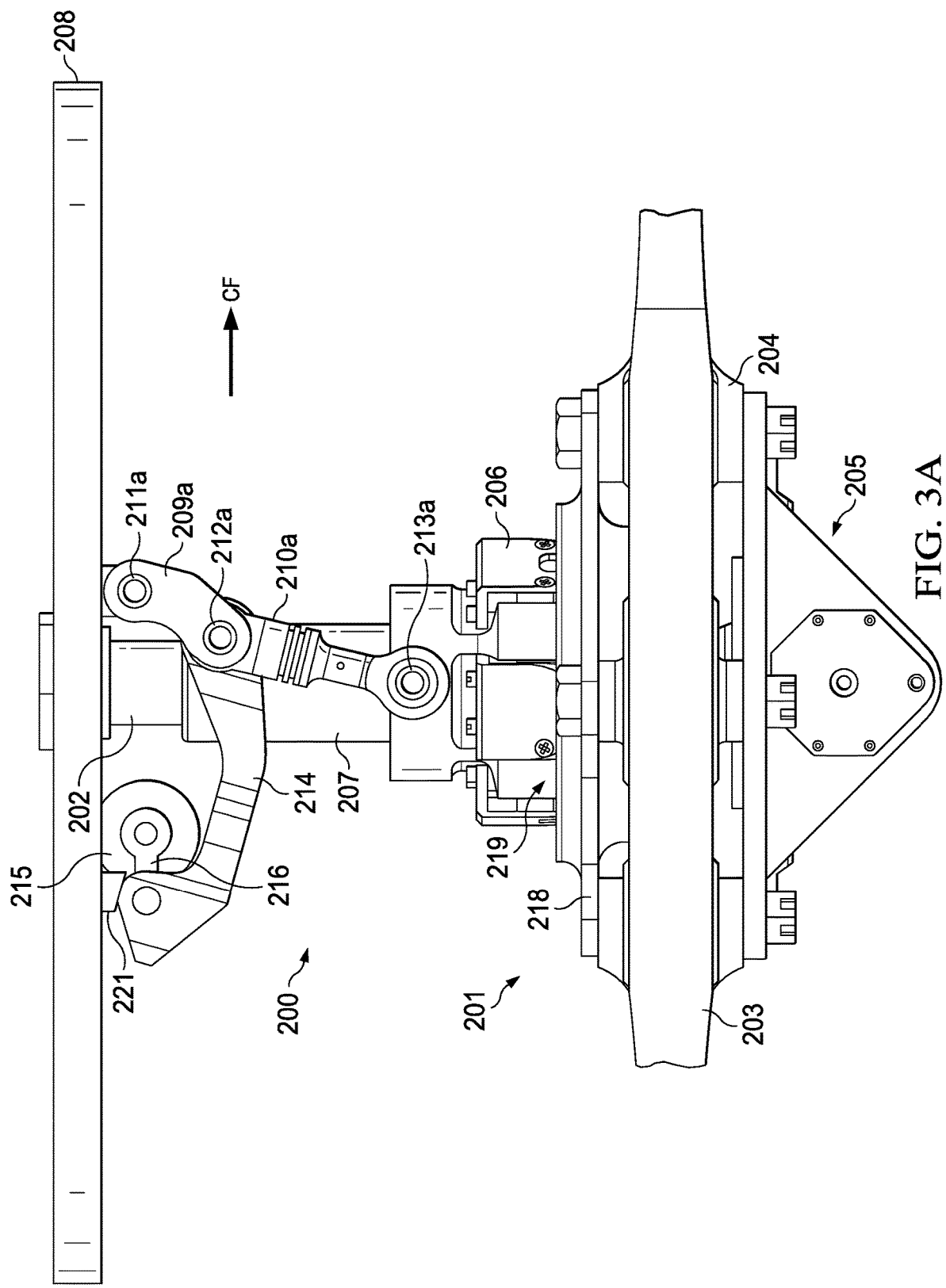
Figure 3B:
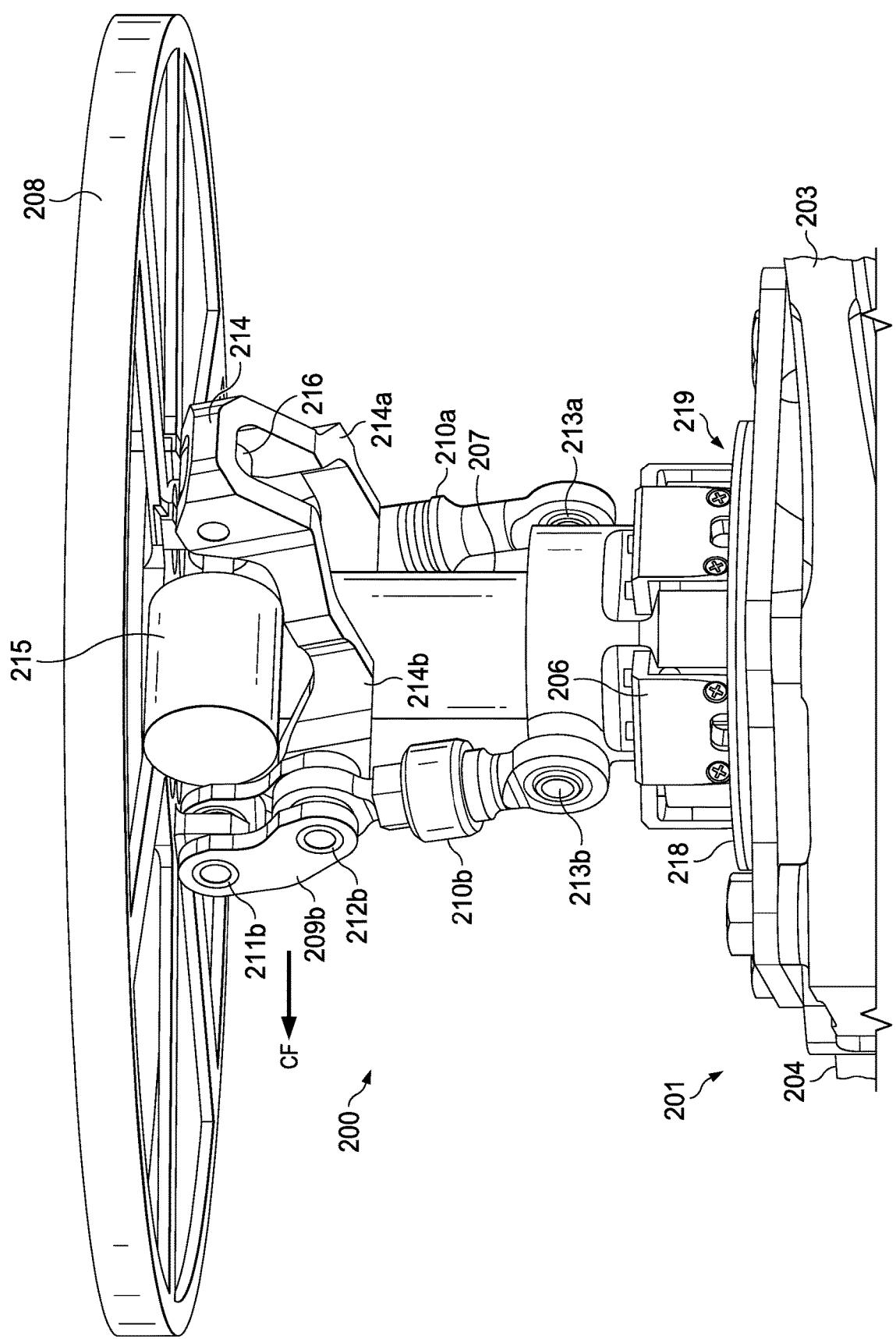

FIGS. 3A and 3B illustrate a gimbal lock assembly in a locked configuration according to an example embodiment.

Figure 4:
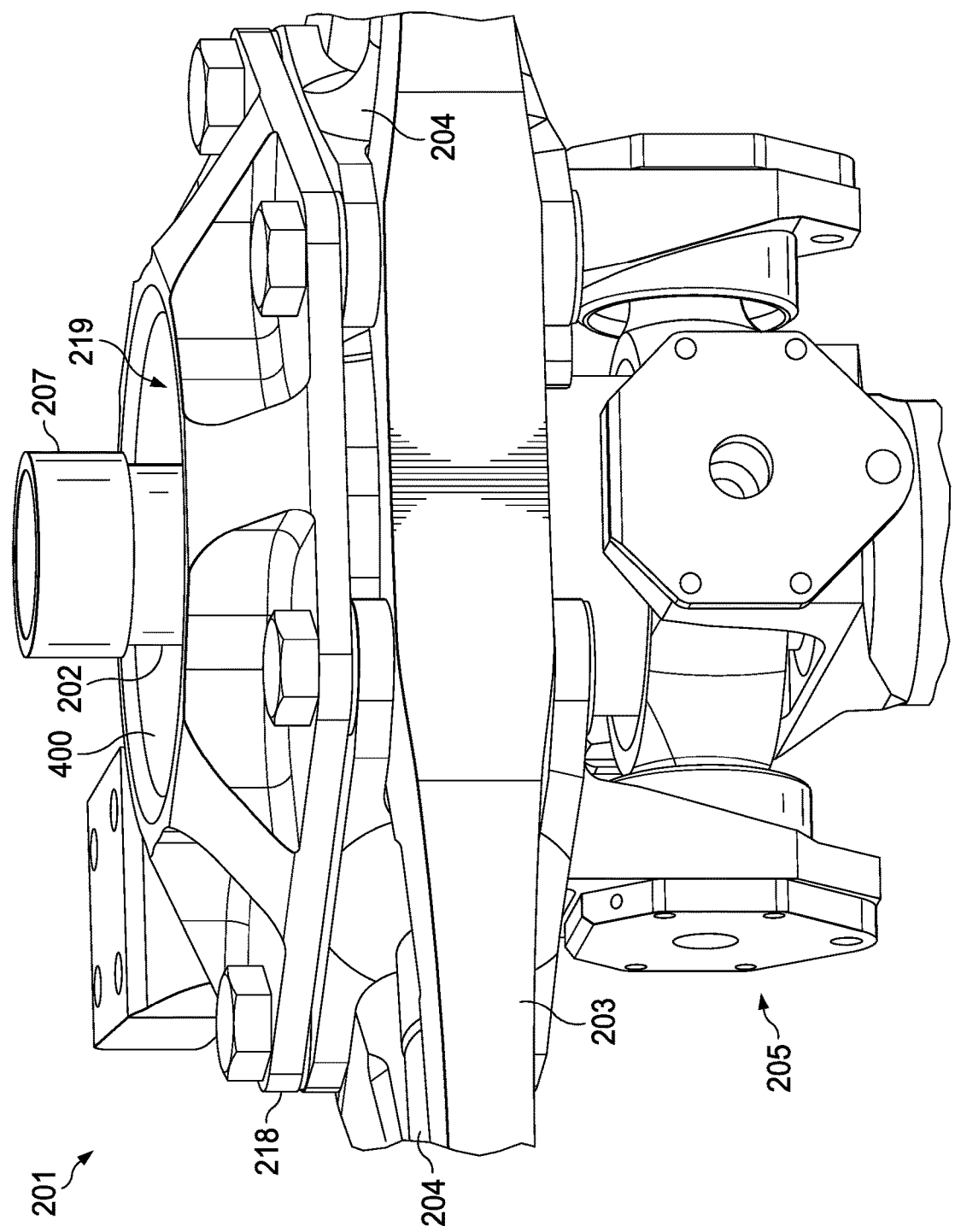

FIG. 4 is an isometric view illustrating the top of the hub assembly and mast according to one embodiment.

Figure 5:
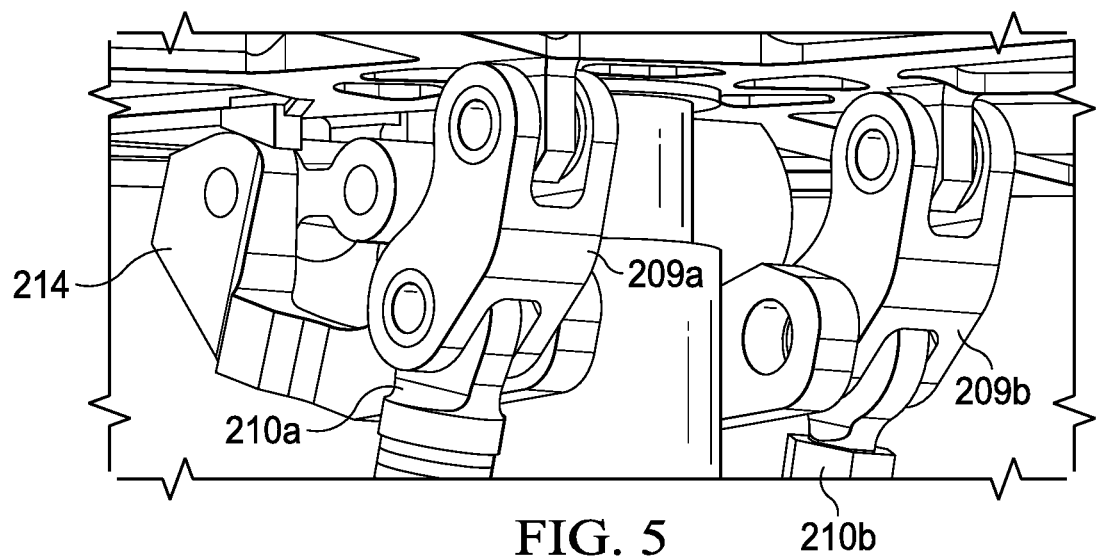

FIG. 5 illustrates pivot idlers configured as separate components.

Figure 6:
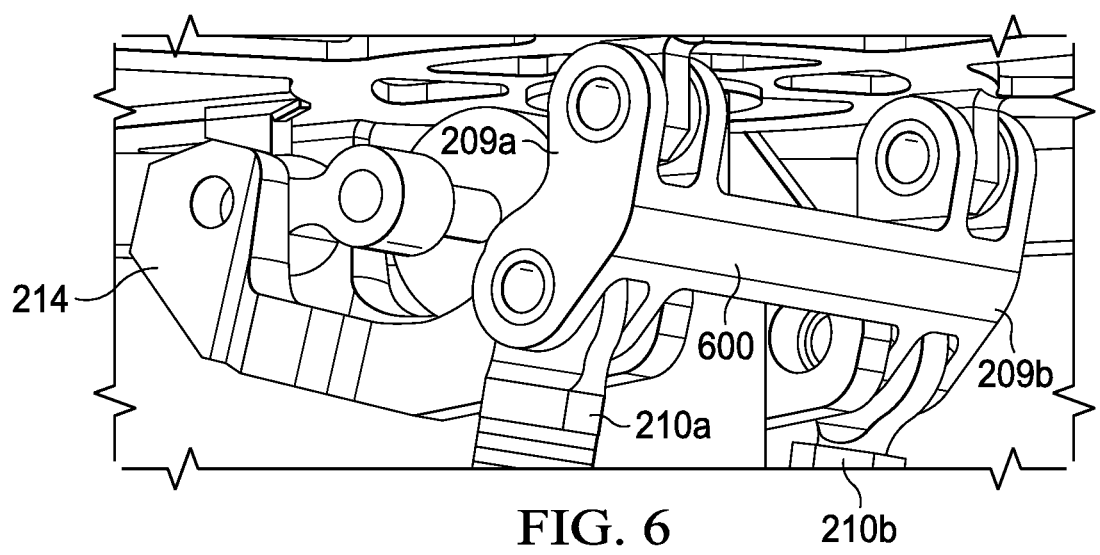

FIG. 6 illustrates two pivot idlers linked as a single component.

FIG. 7 is a cross-section view of a spring-loaded link according to one embodiment.

FIG. 8 is a cross-section view of a spring-loaded link according to an alternative embodiment.

Figure 9:
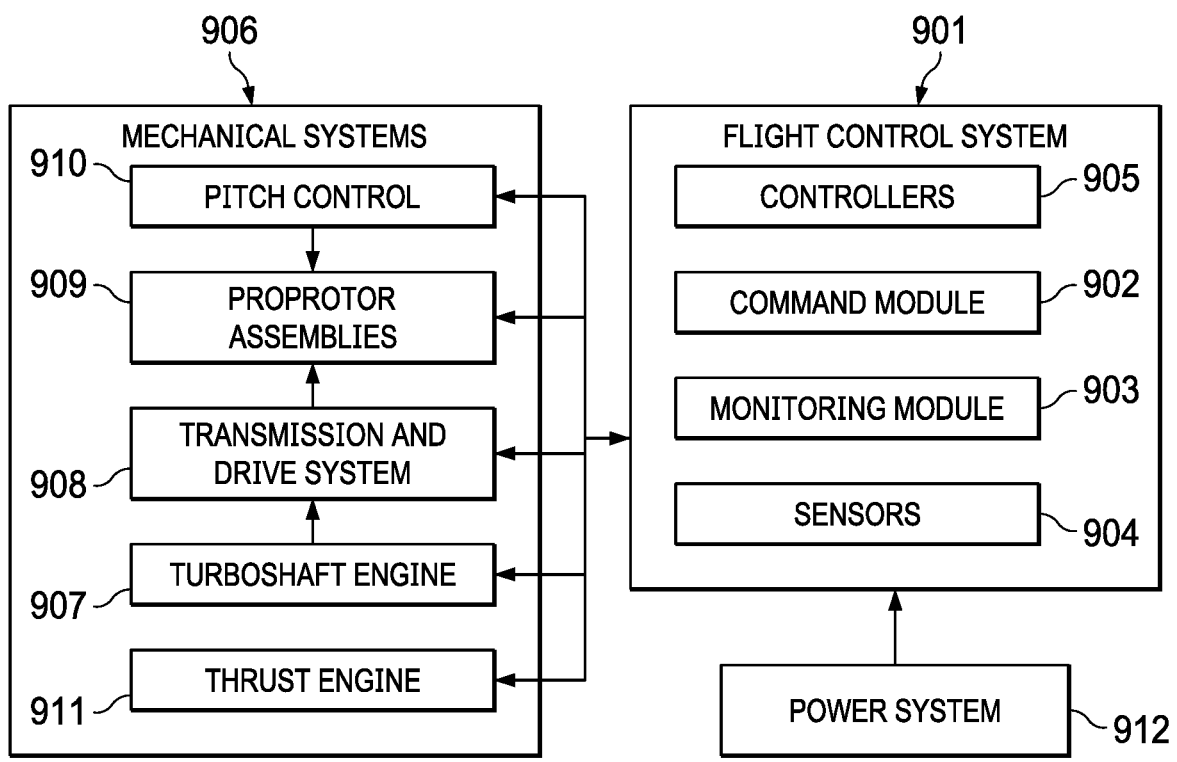

FIG. 9 is a block diagram of systems for an aircraft that is operable for rotor-to-wing conversion as set forth in the present disclosure.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring to FIGS. 1A-1C, a tiltrotor aircraft is schematically illustrated and generally designated 100. Aircraft 100 includes a fuselage 101, wings 102 and tail assembly 103. The wings 102 and tail assembly 103 may include control surfaces, such as ailerons, flaps, slats, spoilers, elevators, rudders, or ruddervators, operable for horizontal and/or vertical stabilization during forward flight. Pylon assemblies 104a, 104b are located at the outboard ends of wing 102 and are rotatable relative to wings 102 between a generally vertical orientation, as best seen in FIG. 1A, and a generally horizontal orientation, as best seen in FIGS. 1B and 1C. The entire pylon assembly 104a, 104b may rotate relative to wing 102, as illustrated in FIG. 1A. In other embodiments, pylon assemblies 104a, 104b may comprise a fixed portion that is attached to wing 102 and a moveable portion that rotates or pivots relative to wing 102.

Pylon assemblies 104a, 104b each house a portion of a drive system that is used to rotate proprotor assemblies 105a, 105b, respectively. The drive system may comprise, for example, engines within fuselage 101 that are coupled to each of the proprotor assemblies 105a, 105b via linkages in wing 102 and pylon assemblies 104a, 104b. Each proprotor assembly 105a, 105b includes a plurality of proprotor blades 106a, 106b that are operable to be rotated, operable to be feathered, and operable to be folded.

FIG. 1A illustrates aircraft 100 in VTOL or helicopter flight mode, in which pylons 104a, 104b are configured in a vertical position and proprotor blades 106a, 106b rotate in a substantially horizontal plane to provide a lifting thrust, such that aircraft 100 flies much like a conventional helicopter.

FIG. 1B illustrates aircraft 100 in a forward flight mode, in which pylons 104a, 104b have been rotated forward to a horizontal position so that proprotor blades 106a, 106b are rotating in a substantially vertical plane to provide a forward thrust thereby enabling wings 102 to provide a lifting force responsive to forward airspeed, such that aircraft 100 flies much like a conventional propeller driven aircraft.

In the rotary flight modes, proprotor assemblies 105a, 105b rotate in opposite directions to provide torque balancing to aircraft 100. For example, when viewed from the front of aircraft 100 in proprotor forward flight mode (FIG. 1B) or from the top in helicopter mode (FIG. 1A), proprotor assembly 105a may rotate clockwise, for example, and proprotor assembly 105b may rotate counterclockwise. In the illustrated embodiment, proprotor assemblies 105a, 105b each include three proprotor blades 106a, 106b that are equally spaced apart circumferentially at approximately 120-degree intervals. It should be understood by those having ordinary skill in the art, however, that the proprotor assemblies 105a, 105b of the present disclosure may have proprotor blades with other designs and other configurations including, for example, proprotor assemblies having two, four, five or more proprotor blades. In addition, it should be appreciated that aircraft 100 can be operated such that proprotor assemblies 105a, 105b are selectively positioned between proprotor forward flight mode and helicopter mode, which can be referred to as a conversion flight mode.

While in the configuration illustrated in FIG. 1B, aircraft 100 may transition between a proprotor-driven forward-flight mode and a thrust-driven forward-flight mode. A thrust engine (not shown) in fuselage 101 is engaged and jet thrust initially supplements the proprotor assemblies 105a, 105b. Then proprotor assemblies 105a, 105b are disengaged from their power source, such as the thrust engine or a separate engine in fuselage 101. The proprotor blades 106a, 106b of proprotor assemblies 105a, 105b are then feathered (i.e., oriented to be streamlined in the direction of flight). In the feathered position, the proprotor blades 106a, 106b may act as brakes to aerodynamically stop the rotation of proprotor assemblies 105a, 105b.

FIG. 1C illustrates aircraft 100 in airplane forward flight mode, in which proprotor blades 106a, 106b of proprotor assemblies 105a, 105b have been folded to be oriented substantially parallel to respective pylon assemblies 104a, 104b. This configuration minimizes the drag force generated by proprotor blades 106b, 106c. The forward cruising speed of aircraft 100 can be significantly higher in a thrust-driven airplane flight mode versus proprotor flight mode by reducing any airspeed-induced proprotor aeroelastic instability. In this configuration, the thrust engine provides forward thrust for aircraft 100, thereby enabling wings 102 to provide a lifting force responsive to the forward airspeed.

Aircraft 100 may also transition from the folded proprotor blade configuration of FIG. 1C back to proprotor flight by slowing below a maximum airspeed for proprotor deployment. Proprotor blades 106a, 106b may then be swept forward into a feathered configuration. Once all proprotor blades are deployed forward and locked into place (as illustrated in FIG. 1B), then the engine may again engage proprotor assemblies 105a, 105b. When torque power is applied to rotate proprotor blades 106a, 106b, aircraft 100 enters proprotor forward-flight mode. Aircraft 100 may then transition to a conversion flight mode and/or helicopter flight mode by rotating proprotor assembly 105a, 105b on pylon assemblies 104a, 104b from a horizontal orientation (FIG. 1B) to a vertical orientation (FIG. 1A).

It will be understood by those having ordinary skill in the art that other engine arrangements are possible and are considered to be within the scope of the present disclosure. For example, in an alternative embodiment, aircraft 100 may have multiple lift engines that provide torque and rotational energy separately to proprotor assemblies 105a, 105b. In addition, even though proprotor assemblies 105a, 105b are illustrated in the context of tiltrotor aircraft 100, it should be understood by those having ordinary skill in the art that the proprotor assemblies disclosed herein can be implemented on other tiltrotor aircraft having multiple wing members 102 and other proprotor assembly configurations.

Apparatus for folding rotor blades on a stop-fold aircraft are disclosed, for example, in U.S. Pat. No. 8,998,125 B2, U.S. Pat. No. 10,336,447 B2, and U.S. Pat. No. 10,526,068 B2, the disclosures of which are hereby incorporated herein by reference in their entirety.

Designs of rotors and propellers for tiltrotor aircraft are often extremely complex. A large number of factors must be considered, including flexure of the rotor under heavy loads and the required motions of the rotor blades with respect to the drive mechanism. The considerations for proprotors, used as both propellers and rotors in aircraft, such as tiltrotor aircraft 100, can be more complex than usual. Gimbaled rotors may be used in such aircraft. In a gimbaled rotor, joints must be provided between a driveshaft or mast that carries torque from the engine and the yoke that drives the blades, giving rise to a relatively complex hub assembly.

Referring now to FIGS. 2A and 2B and FIGS. 3A and 3B, a gimbal lock assembly 200 is illustrated according to one embodiment. The gimbal lock assembly 200 operates to prevent flapping movement of a hub assembly 201 when engaged in the hub assembly 201. FIGS. 2A and 2B show the gimbal lock assembly 200 in a raised or unlocked configuration. FIGS. 3A and 3B show the gimbal lock assembly 200 in a lowered or locked configuration. The views shown in FIGS. 2B and 3B are rotated approximately 120 degrees around mast 202 from the views shown in FIGS. 2A and 3A, respectively.

Gimbal lock assembly 200 and hub assembly 201 are part of a proprotor assembly, such as proprotor assemblies 105a, 105b shown in FIGS. 1A-1C. Hub assembly 201 comprises a yoke 203 having three arms to which rotor blades can be coupled using spindles 204. Mast 202 is coupled to a transmission (not shown), such as a main rotor gearbox, that is in turn coupled to an engine (not shown). Engine torque causes mast 202 to rotate, which in turn rotates hub assembly 201, yoke 203, and rotor blades attached to spindles 204. Mast 202 transmits torque from the engine to hub assembly 201 using a gimble assembly 205, such as a universal joint or Hooke's joint, that allows for hub assembly 201 flapping. With a gimballed hub assembly 201, flapping primarily occurs by tilting/gimbaling the hub/yoke 203 and the rotor blades follow movement of the yoke 203. The rotor blades may also deflect up/down, which is generally referred to as positive/negative coning. Blade flapping occurs when the rotor blade is not rotating normal to the axis of the mast 202. This may be accomplished with independent blade flapping hinges, a teetering hub, or a gimballed hub assembly 201. Blade flapping/coning occurs when an aerodynamic force is exerted on the rotor blade to move it out of a plane normal to the axis of rotation (i.e. mast 202 axis). For example, changing the pitch of the rotor blades to incur aerodynamic forces may create flapping.

While gimbal lock assembly 200 is in the raised position as illustrated in FIGS. 2A and 2B, hub assembly 201 may be tilted in a variety of directions relative to mast 202 due to flapping. Moving hub assembly 201 relative to mast 202 changes the angular relationship between hub assembly 201 and mast 202. This angle may vary during operation. The gimbal assembly couples mast 202 to hub assembly 201 in such a way that torque may be transmitted while maintaining a substantially constant angular velocity throughout a full rotation of the mast 202 and rotor blade assembly 204. Such rotation generates proprotor thrust by rotor blade assembly 204. This proprotor thrust may be used to lift an aircraft in helicopter mode (e.g., FIG. 1A) or to drive the aircraft forward in airplane mode (e.g., FIG. 1B). When the rotor blades are stopped and folded ("stop-fold"), the gimbal lock assembly 200 is moved to a lowered position as illustrated in FIGS. 3A and 3B to lock hub assembly 201 in position and to prevent flapping, such as when the rotor blades are folded.

Gimbal lock assembly 200 comprises a hub lock 206 that is configured to slide up and down along sleeve 207 on mast 202. A mounting plate 208, such as a spinner spoke or other structure, is coupled to, and rotates with, mast 202. Mounting plate 208 provides a structure for attaching the components of gimbal lock assembly 200 and provides a fixed reference for raising and lowering hub lock 206. One or more pivot idlers 209a, 209b and spring-loaded links 210a, 210b are coupled between mounting plate 208 and hub lock 206. The pivot idlers 209a, 209b and spring-loaded links 210a, 210b are pivotably attached to each other and to mounting plate 208 and hub lock 206 at pivot points 211a, 211b, 212a, 212b, 213a, and 213b, respectively. When pivot idlers 209a, 209b are moved outward away from mast 202 as shown in FIGS. 2A and 2B, spring-loaded links 210a, 210b are pulled upwards, which in turn pulls hub lock 206 upward into the unlocked position.

During operation, the entire gimbal lock assembly 200, hub assembly 201, mast 202, and mounting plate 208 rotate together. This rotation generates a centrifugal force (CF) that is directed radially outward and away from mast 202. This centrifugal force acts on pivot idlers 209a, 209b and spring-loaded links 210a, 210b to pull pivot points 212a, 212b outward and to hold hub lock 206 in the raised position. In one embodiment, the centrifugal force alone is sufficient to hold hub lock 206 in the raised position shown in FIGS. 2A and 2B. For example, the position of the lock assembly 200 in the unlocked position may be designed to create a centrifugal force load on links 209a, 209b, 210a, and 210b that is sufficient to move pivot points 212a and 212b outward. This configuration would then hold lock assembly 200 in the raised and unlocked position. The weight of the links 209a, 209b, 210a, and 210b may be selected to react to the centrifugal force load in this way or additional weight may be attached to the system, such as at pivot points 212a and 212, to create more centrifugal force to hold the mechanism unlocked.

In another embodiment, springs may be incorporated in lock assembly 200 to hold the mechanism unlocked. For example, torsion springs may be coupled at joints 211a, 211b between links 209a, 209b and mounting plate 208 or at joints 212a, 212b between links 209a, 209b and links 210a, 210b. Alternatively, an extension spring may be attached between joints 212a, 212b and the outside edge of mounting plate 208 to pull links 209a, 209b, 210a, and 210b outward.

Pivot idlers 209a, 209b and spring-loaded links 210a, 210b are further coupled to a forked idler 214 at pivot points 212a, 212b. Forked idler 214 branches around opposite sides of mast 202. Forked idler 214 can be moved laterally toward or away from mast 202 by actuator 215. Rotary arm 216 couples forked idler 214 to actuator 215, which may be an electric motor or hydraulic actuator, for example. When actuator 215 rotates toward mast 202 (e.g., counterclockwise in FIG. 2A), rotary arm 216 forces forked idler 214 toward mast 202, which in turn forces pivot points 212a, 212b outward in the direction of the centrifugal force. If actuator 215 is powered down, then the centrifugal force will continue to pull pivot idlers 209a, 209b and spring-loaded links 210a, 210b outward thereby keeping hub lock 206 in the raised and unlocked position. In one embodiment, forked idler 214 is shaped and configured to also act as a mechanical stop wherein the top 217 of hub lock 206 rests against forked idler 214 in the fully raised position. In other embodiments, a different mechanical stop may be used, such as a mechanical stop on mounting plate 208 that prevents outward and/or upward movement of pivot idlers 209a, 209b beyond a certain point, which would in turn limit the upward movement of hub lock 206.

Referring to FIG. 4, which is an isometric view illustrating the top of the hub assembly 201 and mast 202, hub assembly 201 further comprises a hub extension 218. The inner wall 400 of hub extension 218 and mast 202 form an annular space or opening 219 surrounding mast 202. Annular space 219 in hub extension 218 forms an opening that is adapted to receive hub lock 206. The inner wall 400 of hub extension 218 and the outer surface of hub lock 206 may have a slight taper, such as less than two degrees pitch, to help guide hub lock 206 into space 219. This also ensures that hub lock 206 can securely fit into space 219 with minimal excess space for hub assembly 201 to flap once hub lock 206 is engaged. Rollers 220 guide hub lock 206 into space 219 and assist hub lock 206 in fully engaging hub extension 218 in the locked position. When hub lock 206 is lowered into space 219 to prevent flapping of yoke 203, the hub assembly 201 is still be capable of rotating with mast 202.

As shown in FIGS. 3A and 3B, when actuator 215 rotates away from mast 202 (e.g., clockwise in FIG. 3A), rotary arm 216 forces forked idler 214 away from mast 202, which in turn forces pivot points 212a, 212b inward. This causes pivot idlers 209a, 209b and spring-loaded links 210a, 210b to rotate about pivot points 211a, 211b, 213a, and 213b, respectively, which forces hub lock 206 down and into space 219. Forked idler 214 moves outward until it engages mechanical stop 221, which prevents further movement in that direction. When hub lock 206 is in the locked position, the free pivot points 212a, 212b on pivot idlers 209a, 209b are moved inboard of the fixed pivot points 211a, 211b, which is referred to herein as an over-center position.

Spring-loaded links 210a, 210b hold pivot idlers 209a, 209b in the over-center position by applying a spring force against free pivot points 212a, 212b. Forked idler 214 will apply an inward force (i.e., against the centrifugal force) on pivot points 212a, 212b as long as actuator 215 continues to force rotary arm 216 clockwise. However, if actuator 215 is powered down, spring-loaded links 210a, 210b will continue to assert a force against pivot points 212a, 212b, which holds pivot idlers 209a, 209b in the over-center position thereby holding hub lock 206 in the locked position against the centrifugal force. This provides a passive lock for hub lock 206.

In an alternative embodiment, to provide a redundant locking feature, a magnet (not shown) may hold fork idler 214 in place against mechanical stop 221. For example, the magnet may be in either or both fork idler 214 and mechanical stop 221. The magnet may be only in one component and the other component may comprise a magnetic material that is attracted to the magnet. The magnet's operation may be selectable so that is active only when hub lock 206 is desired in the locked configuration. Such a magnetic lock would provide redundancy to the over-center passive locking design of hub lock 200.

In another alternative embodiment, an extension or torsional spring (not shown) may hold fork idler 214 in place against mechanical stop 221 and/or may exert a force on fork idler 214 toward closed position.

The example embodiment illustrated in FIGS. 2A, 2B, 3A, and 3B shows two pairs of pivot idlers 209a, 209b and spring-loaded links 210a, 210b. Using two idler and link pairs provides balanced forces to move hub link 206 between the open and closed position, in other embodiments only one pivot idler and spring-loaded link pair is required. For example, only pair 209a-210a or pair 209b-210b is required to move hub link 206.

In some embodiments, pivot idlers 209a and 209b may be separate components as illustrated in FIG. 5. This would allow each pivot idler 209a, 209b to move independently with its associated spring-loaded link 210a, 210b. Alternatively, pivot idlers 209a and 209b may be linked together as a single component as shown in FIG. 6. Linking member 600 couples pivot idlers 209a and 209b together so that they do not move independently.

Fork idler 214 is shown in FIGS. 2A, 2B, 3A, and 3B as a single component that links actuator 215 to both pivot idler and spring-loaded link pairs. However, in other embodiments, the function of fork idler 214 may be provided by two separate idler components that are individually linked between actuator 215 and each separate pivot idler and spring-loaded link pair. For example, each arm 214a and 214b (FIG. 3B) of fork idler 214 may be separate idlers that are not attached to each other at rotary arm 216 as shown. Instead, each idler arm 214a, 214b may be independently connected to actuator 215 and/or rotary arm 216.

For illustration purposes, two different spring-loaded links 210a and 210b are shown in FIGS. 2A, 2B, 3A, and 3B. It will be understood that, in other embodiments, the same type of spring-loaded link may be used on both sides of the gimbal lock assembly 200. Spring-loaded link 210a represents a smaller design than spring-loaded link 210b in an example embodiment.

FIG. 7 is a cross-section view of spring-loaded link 210a. A tube portion 701 is hollow and has an interior channel 702. A plunging link portion 703 has a piston portion 704 that is located within channel 702. Plunging link portion 703 can move relative to tube portion 701 by sliding piston portion 704 within channel 702. A pin 705 passes through both tube portion 701 and piston portion 704. Pin 705 moves within notch 706, which limits the range of motion of plunging link portion 703 relative to tube portion 701. Spring 707 forces plunging link portion 703 away from tube portion 701, which has the effect of pushing link ends 708 away from each other. Each link end 708 has a rod end bearing 709 for connecting to other components, such as idler link 209a, forked link 214, and hub lock 206.

FIG. 8 is a cross-section view of spring-loaded link 210b. A tube portion 801 is hollow and has an interior channel 802. A plunging link portion 803 has a piston portion 804 that is located within channel 802. Plunging link portion 803 can move relative to tube portion 801 by sliding piston portion 804 within channel 802. A spring 805 forces plunging link portion 803 away from tube portion 801, which has the effect of pushing link ends 806 away from each other. Each link end 806 has a rod end bearing 807 for connecting to other components, such as idler link 209b, forked link 214, and hub lock 206. A cap 808 holds tube portion 801 and piston portion 804 together. Cap 808 and the space available in channel 802 for piston 804 limit the range of motion of plunging link portion 803 relative to tube portion 801. Cap 808 also protects the interior of spring-loaded link 210b from dirt and debris so that spring 805 and piston 804 are able to move freely.

Springs 707 and 805 may be any appropriate material such as a coiled wire, rubber, or compressible gas. In one embodiment, spring-loaded links 210a, 210b may use bevel washers in order to create a springing effect. The number of bevel washers 707, 805 can be increased or decreased to change the spring rate of the link. Normal washers may also be inserted into the spring cavity along with the bevel washers to change the nominal length of the link assembly. Alternative link designs that incorporate a coil spring, for example, may change spring rates by using different springs.

FIG. 9 is a block diagram of systems for an aircraft that is operable for rotor-to-wing conversion as set forth in the present disclosure and as illustrated in FIGS. 1-8. In the illustrated embodiment, a flight control system 901 includes a command module 902, a monitoring module 903, a plurality of sensors 904, and a plurality of controllers 905. In the illustrated embodiment, mechanical systems 906 include turboshaft engine 907, which drives transmission and drive system 908, proprotor assemblies 909, and pitch control systems 910, and thrust engine 911. Turboshaft engine 907 drives proprotor assemblies 909 via transmission and drive system 908. Alternatively, turboshaft engine 907 may have a direct drive relationship with a proprotor assembly 909.

Turboshaft engine 907 is mechanically coupled to transmission and drive system 908 via a drive shaft or other suitable connection. Transmission and drive system 908 includes one or more clutch assemblies or other suitable engagement assemblies to enable selective coupling and decoupling between turboshaft engine 907 and proprotor assemblies 909 so that engine power to proprotor assembly 909 can be engaged in some modes, such as vertical takeoff and landing mode, and disengaged in other modes, such as forward-flight mode.

Pitch control system 910 includes, for example, a swash plate operable to provide collective pitch control to a proprotor assembly 909 in all operational modes of the aircraft. Pitch control assembly 910 provides full helicopter-type pitch control to proprotor assembly 909, including both collective and cyclic pitch control, in vertical takeoff and landing modes, collective pitch control in forward-flight mode, and collective pitch control during rotor-to-wing and wing-to-rotor conversions. Proprotor assemblies 909 and pitch control 910 may cooperatively function to stop and fold the aircraft's rotor blades in some flight modes, such as forward-flight or airplane mode.

Thrust engine 911 may be, for example, a gas turbine engine that provides a jet thrust force for propelling the aircraft during airplane or forward-flight modes. Turboshaft engine 907 and thrust engine 911 may be liquid fuel powered engines, such as gasoline, jet fuel, or diesel powered engine, including gas turbine and rotary engines.

A power system 912, such as battery or electrical generator, provides electrical power to flight control systems 901 either directly or via a power distribution bus. The aircraft may be operated autonomously in response to commands generated by flight control system 901, which may be, for example, a digital flight control system that includes a non-transitory computer readable storage medium including a set of computer instructions executable by a processor. Aspects of flight control system 901 may be implemented on a general-purpose computer, a special purpose computer, or other machine with memory and processing capability. For example, flight control system 901 may include one or more memory storage modules including, but not limited to, internal storage memory such as random access memory, non-volatile memory such as read only memory, removable memory such as magnetic storage memory, optical storage, solid-state storage memory or other suitable memory storage entity. Aspects of flight control system 901 may be microprocessor-based systems operable to execute program code in the form of machine-executable instructions. In addition, flight control system 901 may be selectively connectable to other computer systems via a proprietary encrypted network, a public encrypted network, or other suitable communication network that may include both wired and wireless connections.

Flight control system 901 includes a command module 902 and a monitoring module 903. It will be understood by those having ordinary skill in the art that these and other modules executed within flight control system 901 may be implemented in a variety of forms including hardware, software, firmware, special purpose processors, and combinations thereof. Flight control system 901 including a plurality of sensors 904 that obtain input from a variety of sources, such as data relating to parameters of the various mechanical systems 906. In addition, sensors 904 may obtain data relating to other important flight or mission parameters, such as positioning data, attitude data, speed data, environmental data, temperature data, target data, and the like. Flight control system 901 may include a plurality of controllers 905, such as electro-mechanical actuators, that provide inputs to the mechanical systems 906 to enable operations.

In an operational example, flight control system 901 may receive mission instructions from an external source, such as a command and control system. Thereafter, flight control system 901 may autonomously control all aspects of flight of an aircraft of the present disclosure. During the various operating modes of the aircraft, including vertical takeoff and landing mode, hovering mode, forward flight mode, and transitions therebetween, command module 902 provides commands to controllers 905 to establish the desired operating positions of the various mechanical systems 906. For example, these commands may relate to the engagement or disengagement of turboshaft engines 907 with proprotor assembly 909, the position of pitch control system 910, and the like. Flight control system 901 receives feedback from sensors 904 that are associated with the various mechanical systems 906. This feedback is processes by monitoring module 903, which supplies correction data and other information to command module 902. Monitoring module 903 preferably receives and processes additional sensor information, such as position data, attitude data, speed data, environmental data, fuel data, temperature data, location data, and the like. Monitoring module 903 provides the processed information to command module 902 to further enhance autonomous flight control capabilities. In some embodiments, some or all of the autonomous control capability of flight control system 901 may be augmented or supplanted by remote flight control from a command and control station via a communication link, such as a wireless communication channel. Alternatively, or additionally, some or all of the autonomous and/or remote flight control of flight control system 901 may be augmented or supplanted by onboard pilot flight control in manned embodiments.

In one embodiment, sensors 904 and monitoring module 903 may monitor the position of a rotor hub and rotor blades associated with one or more proprotor assemblies 909. In particular, the sensors may detect a degree of flapping in the rotor hub and rotor blades and a configuration of a hub lock. Command module 902 may determine when the aircraft should be transitioned between prop-driven forward flight and a stop-fold mode, such as at the direction of a pilot, autopilot, or remote command. Command module 902 may direct appropriate controllers 905 to stop rotation of proprotor assemblies 909, feather the rotor blades, and then fold the rotor blades. During the stop-fold transition, command module 902 may direct controllers 905 to engage a hub lock, such as the systems disclosed herein, to prevent rotor flapping. Similarly, command module 902 may direct controllers 905 to disengage the hub lock when the aircraft transitions from the stop-fold mode to prop-driven forward flight.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A propulsion assembly for an aircraft, comprising:
a mast;
a hub assembly coupled to the mast and having a gimballing degree of freedom relative to the mast, the hub assembly having an inner hub wall spaced part from the mast;
a gimbal lock positioned about the mast, the gimbal lock configured to fit between the inner hub wall and the mast in an engaged position; and
an over-center locking mechanism coupled to the gimbal lock, the over-center locking mechanism having a pivot idler coupled to the mast and a spring-loaded link coupled between the pivot idler and the gimbal lock;
wherein the pivot idler is configured to rotate between a locked over-center position and an open position, the pivot idler configured to be held in the locked over-center position by the spring-loaded link and configured to be held in the open position by a centrifugal force generated by rotation of the mast or by a spring force;
wherein the gimbal lock is movable between a disengaged position and the engaged position relative to the hub assembly, the gimbal lock enabling the gimballing degree of freedom in the disengaged position and disabling the gimballing degree of freedom in the engaged position; and
wherein the over-center locking mechanism is configured to move the gimbal lock between the engaged position and the disengaged position.

2. The propulsion assembly of claim 1, further comprising:
a mounting bracket attached to the mast, wherein the pivot idler is coupled to the mast by the mounting bracket.

3. The propulsion assembly of claim 1, further comprising:
an activation idler coupled to a joint between the pivot idler and the spring-loaded link;
wherein movement of the activation idler in a first direction causes the hub lock to move toward the disengaged position and movement of the activation idler in a second direction causes the hub lock to move toward the engaged position.

4. The propulsion assembly of claim 3, further comprising:
an actuator coupled to the activation idler, wherein the actuator is configured to move the activation idler alternatively in the first direction and in the second direction.

5. The propulsion assembly of claim 4, wherein the actuator is an electronic motor.

6. The propulsion assembly of claim 3, further comprising:
one or more mechanical stops configured to prevent movement of the activation idler beyond a fixed position.

7. The propulsion assembly of claim 1, further comprising:
a plurality of rollers on the gimbal lock, the rollers configured to align the gimbal lock and the hub assembly when the gimbal lock is moved to the engaged position.

8. The propulsion assembly of claim 1, further comprising:
a hub extension coupled to the hub assembly, the hub extension positioned about the mast and forming at least a portion of the inner hub wall spaced part from the mast.

9. A propulsion assembly for an aircraft, comprising:
a mast;
a hub assembly coupled to the mast and having a gimballing degree of freedom relative to the mast, the hub assembly having an inner hub wall spaced part from the mast;
a gimbal lock positioned about the mast, the gimbal lock configured to fit between the inner hub wall and the mast in an engaged position; and
an over-center locking mechanism coupled to the gimbal lock, the over-center locking mechanism comprising a plurality of pivot idlers coupled to the mast by a mounting assembly;
a plurality of spring-loaded links, each spring-loaded link coupled between an individual pivot idler and the gimbal lock; and
an activation idler coupled to hinged joints between each pivot idler and spring-loaded link;
wherein movement of the activation idler in a first direction causes each pivot idler and spring-loaded link to fold together thereby moving the hub lock toward a disengaged position relative to the hub assembly; and
wherein movement of the activation idler in a second direction causes each pivot idler and spring-loaded link to align thereby moving the hub lock toward an engaged position relative to the hub assembly.

10. The propulsion assembly of claim 9, wherein two pivot idlers are positioned on opposite sides of the mast; and
wherein the activation idler has two arms extending across opposite sides of the mast, each arm coupled to a separate pivot idler.

11. The propulsion assembly of claim 9, wherein two pivot idlers are positioned on opposite sides of the mast; and
wherein the two pivot idlers are joined by a linking member.

12. An aircraft, comprising:
a fuselage;
a wing coupled to the fuselage; and
a propulsion assembly rotatably coupled to the wing, the propulsion assembly comprising:
a mast;
a hub assembly coupled to the mast and having a gimballing degree of freedom relative to the mast, the hub assembly having an inner hub wall spaced part from the mast;
a gimbal lock positioned about the mast, the gimbal lock configured to fit between the inner hub wall and the mast in an engaged position; and
an over-center locking mechanism coupled to the gimbal lock, the over-center locking mechanism comprising:
two pivot idlers coupled to the mast by a mounting assembly;
two spring-loaded links, each spring-loaded link coupled between an individual pivot idler and the gimbal lock, wherein pairs of pivot idlers and spring-loaded links are coupled by a hinged join; and
an activation idler coupled to the hinged joints on each pair of pivot idler and spring-loaded link;
wherein the gimbal lock is movable between a disengaged position and the engaged position relative to the hub assembly, the gimbal lock enabling the gimballing degree of freedom in the disengaged position and disabling the gimballing degree of freedom in the engaged position; and
wherein the over-center locking mechanism is configured to move the gimbal lock between the engaged position and the disengaged position.

13. The aircraft of claim 12, wherein the pivot idlers are positioned on opposite sides of the mast; and
wherein the activation idler comprises two arms extending across opposite sides of the mast, each arm coupled to a separate hinged joint.

14. The aircraft of claim 12, further comprising:
an actuator coupled to the activation idler and configured to move the actuation idler in a first direction and in a second direction;
wherein movement of the activation idler in the first direction causes the hub lock to move toward the disengaged position and movement of the activation idler in a second direction causes the hub lock to move toward the engaged position.

15. The aircraft of claim 14, wherein the actuator is an electronic motor.

16. The aircraft of claim 12, wherein the pivot idlers are configured to rotate between a locked over-center position and an open position;
wherein the pivot idlers are held in the locked over-center position by the spring-loaded links; and
wherein the pivot idlers are held in the open position by a centrifugal force generated by rotation of the mast or by a spring force.

17. The aircraft of claim 14, wherein movement of the activation idler in the first direction causes each pivot idler and associated spring-loaded link to fold together thereby moving the hub lock toward the disengaged position; and
wherein movement of the activation idler in the second direction causes each pivot idler and associated spring-loaded link to align thereby moving the hub lock toward the engaged position.

* * * * *